US006956353B1

(12) United States Patent
Klitzner

(10) Patent No.: US 6,956,353 B1
(45) Date of Patent: Oct. 18, 2005

(54) UNIVERSAL BATTERY CHARGER FOR CELLULAR TELEPHONES AND OTHER BATTERY OPERATED DEVICES

(76) Inventor: Orrin Edward Klitzner, P.O. Box 675, Sparta, NJ (US) 07871-0675

( * ) Notice: Subject to any disclaimer, the term of this patent is extended or adjusted under 35 U.S.C. 154(b) by 0 days.

(21) Appl. No.: 10/268,884

(22) Filed: Oct. 11, 2002

(51) Int. Cl.[7] .................................... H02J 7/00
(52) U.S. Cl. ...................................... 320/107; 320/111
(58) Field of Search ........................ 320/107, 111, 113, 320/114, 127, 137, 138, 112, 115, 125; 429/52, 429/97, 98, 99, 100; 307/150, 125, 126

(56) References Cited

U.S. PATENT DOCUMENTS

| | | | | |
|---|---|---|---|---|
| 4,636,703 A * | 1/1987 | Tohya et al. | 320/110 |
| D349,096 S | 7/1994 | Hyvönen | D13/107 |
| D392,250 S | 3/1998 | Yiin | D13/107 |
| 5,736,830 A | 4/1998 | Weng | 320/108 |
| 5,847,545 A * | 12/1998 | Chen et al. | 320/138 |
| 6,043,626 A | 3/2000 | Snyder et al. | 320/113 |
| D433,379 S | 11/2000 | Jokinen | D13/107 |
| D434,370 S | 11/2000 | Sun et al. | D13/107 |
| 6,184,654 B1 | 2/2001 | Bachner, III et al. | 320/114 |
| D442,543 S | 5/2001 | Krumenacker et al. | D13/107 |
| 6,597,152 B1 * | 7/2003 | Jacobs et al. | 320/113 |
| 6,621,248 B1 * | 9/2003 | Li | 320/125 |
| 6,634,896 B1 * | 10/2003 | Potega | 439/218 |

FOREIGN PATENT DOCUMENTS

GB 2 242 794 10/1991

* cited by examiner

*Primary Examiner*—Donald Sparks
*Assistant Examiner*—Lawrence Luk
(74) *Attorney, Agent, or Firm*—Swift Law Office; Stephen Christopher Swift

(57) ABSTRACT

A universal battery charger for cellular telephones and other battery operated devices. It also may be used to power a battery operated device when there are no batteries in the device. It can charge a battery from power sources having different voltages (e.g., a 12 volt car cigarette lighter, or a 110 or 120 volt wall outlet) and can charge a battery when no external power source is available. It has a built in battery pack, using a no-memory battery, that can be charged from any of the power sources. The battery pack can hold a charge and be discharged only upon demand. The preferred embodiment includes a 110/220 AC plug, and male and female 12 volt cigarette lighter plugs. Optionally, a DC to DC converter or similar device may be incorporated, so that the invention can recharge batteries requiring different voltages (e.g. 6 and 12 volt batteries).

1 Claim, 5 Drawing Sheets

14
18
10
110V
20
220V
12
16
6V
12V
22

UNIVERSAL BATTERY CHARGER FOR CELLULAR TELEPHONES AND OTHER BATTERY OPERATED DEVICES

BACKGROUND OF THE INVENTION

1. Field of the Invention

The present invention relates to battery chargers for battery powered devices.

2. Description of the Prior Art

There have been numerous prior inventions of apparatus to charge batteries and battery powered devices such as cellular telephones, but none that are equivalent to the present invention.

U.S. Pat. No. 4,636,703, issued on Jan. 13, 1987, to Syoichi Tohya and Minoru Takahashi, discloses a charging apparatus, by which batteries can be recharged from a wall socket. The instant invention is distinguishable, in that it includes male and female cigarette lighter plugs.

U.S. Pat. No. 5,736,830, issued on Apr. 7, 1998, to Ying-Chao Weng, discloses a mobile telephone charger, including a transformer with blades that can be inserted into a wall socket, and, in a separate detachable unit, a transfer base with a male plug that can be inserted into a cigarette lighter ("direct electric current socket" in claim 1. b)). The instant invention is distinguishable, in that includes the plug for a wall socket, and both male and female "cigarette lighter" plugs in one integral unit.

U.S. Pat. No. 5,847,545, issued on Dec. 8, 1998, to Solomon Chen and Harry Mkhitarian, discloses a dual alternating current and direct current powered portable battery charger, having a plug for alternating current, a male plug for direct current that can be inserted into an automobile's cigarette lighter, and perhaps a female plug for direct current that is attached the main body of the device by a cord. The instant invention is distinguishable, in that it has all of the plugs in its main body.

U.S. Pat. No. 6,043,626, issued on Mar. 28, 2000, to Thomas D. Snyder and Timothy Banyas, discloses an auxiliary battery holder with multicharger functionality, including a cradle for holding an electronic device, such as a cell phone. The instant invention is distinguishable, in that it includes both male and female "cigarette lighter" plugs and a plug for a wall socket.

U.S. Pat. No. 6,184,654, issued on Feb. 6, 2001, to Edward F. Bachner, III and Xin Du, discloses a wearable docking-holster system, with energy management, to support portable electronic devices, such as cell phones. Again, the instant invention is distinguishable, in that it includes both male and female "cigarette lighter" plugs and a plug for a wall socket.

U.S. Patent No. Des. 349,096, issued on Jul. 26, 1994, to Tapani Hyvönen, discloses a design for a battery charger for a mobile phone connectable to a cigarette lighter socket, but without a plug for a wall socket, as in the instant invention.

U.S. Patent No. Des. 392,250, issued on Mar. 17, 1998, to Chin-Kuan Yiin, discloses a design for car's battery charger, without a plug for a wall socket.

U.S. Patent No. Des. 406,261, issued on Mar. 2, 1999, to Jan Kettula and Anu Suomalainen, discloses a design for a cigarette lighter charger, having a male plug only.

U.S. Patent No. Des. 433,379, issued on Nov. 7, 2000, to Tapani Jokinen, discloses a design for a cigarette lighter charger with hands-free facility.

U.S. Patent No. Des. 434,370, issued on Nov. 28, 2000, to Yeo Chung Sun, Jeremy Sun Ting Kung and Jeanna Kimbré, discloses a design for a travel charger, having a plug for a wall socket, but no plugs for cigarette lighters.

U.S. Patent No. Des. 442,543, issued on May 22, 2001, to Kimberly Rae Krumenacker and Kurt Martin Hickey, discloses a design for a vehicle charger, without a female cigarette lighter plug.

British Patent Application No. 2 242 794, published on Oct. 9, 1991, inventor Ian Ashworth, discloses an apparatus for charging two batteries according to a priority sequence, specifically designed for cellular telephones.

None of the above inventions and patents, taken either singly or in combination, is seen to describe the instant invention as claimed.

SUMMARY OF THE INVENTION

The present invention is a universal battery charger for cell phones and other battery operated devices. It can charge a battery from power sources having different voltages (e.g., a 12 volt car cigarette lighter, or a 110 or 120 volt wall outlet) and can charge a battery when no external power source is available. It has a built in battery pack, using a no-memory battery, that can be charged from any of the power sources. The battery can hold a charge and be discharged only upon demand. The battery produces current of sufficient amperage and voltage to charge multiple cell phones or other devices, before it must be recharged. Optionally, a DC to DC converter or similar device may be incorporated, so that the device can recharge batteries requiring different voltages. One self-contained unit can replace a car charger (using a cigarette lighter) and/or a home charger (using a wall outlet), and charge devices when no external source of power is available. By using a 12 volt cigarette lighter plug, the unit will work with a cell phone or similar device, without requiring any additional adaptors. It also may be used to power a battery operated device when there are no batteries in the device. The preferred embodiment includes a 110/220 AC plug, and male and female 12 volt cigarette lighter plugs.

Accordingly, it is a principal object of the invention to provide a means for recharging battery operated devices having a variety of voltages using power sources having a variety of voltages.

It is another object of the invention to provide a means for recharging the batteries in battery operated devices using power from either a wall socket or an automobile cigarette lighter.

It is a further object of the invention to provide an apparatus that can store power from either a wall socket or an automobile cigarette lighter, to later recharge batteries or battery operated devices.

Still another object of the invention is to provide an apparatus that can power a battery operated device when there are no batteries in the device.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

The present invention is a universal battery charger for cellular telephones and other battery operated devices.

Figure 1:
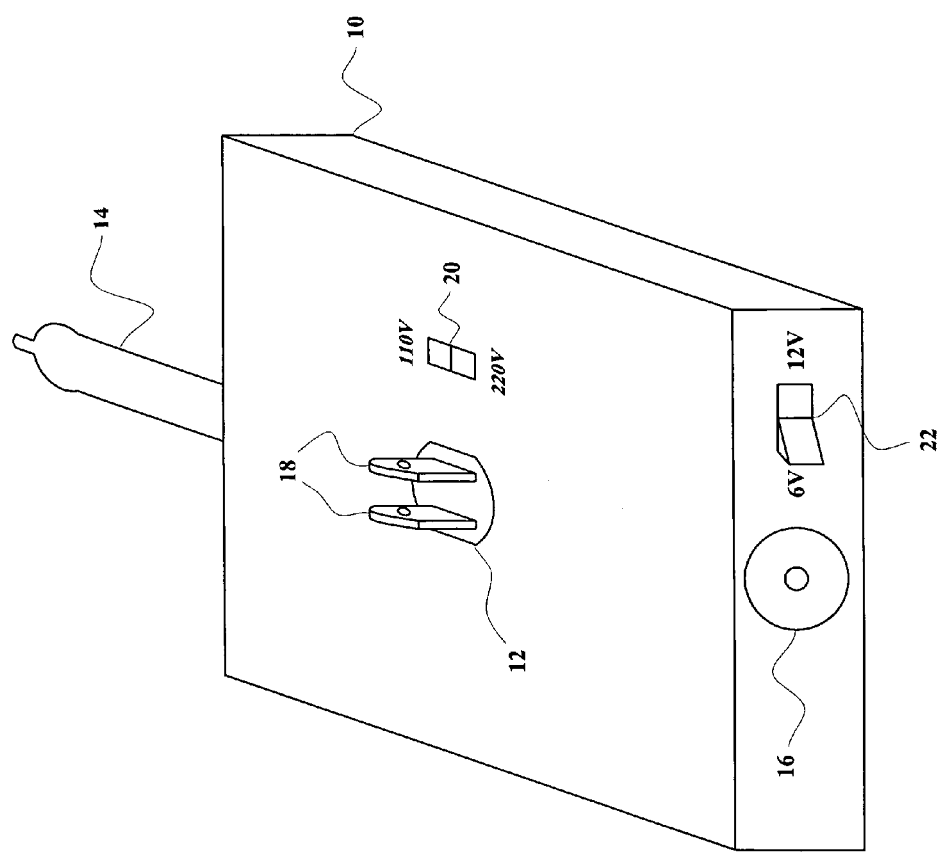
FIG. 1 is perspective view of the preferred embodiment of the invention.

FIG. 1 is perspective view of the preferred embodiment of the invention, showing the housing 10, a first male plug 12 that is suitably dimensioned and configured to fit into a standard wall socket, a generally cylindrical second male plug 14 that is suitably dimension and configured to fit into an automobile cigarette lighter, and a female plug 16, retained in the housing in a fixed position, that is suitably dimensioned and configured to receive a male plug of an electrically powered device such as a cellular telephone. The first male plug has two prongs 18. (Alternatively, the first male plug may have three prongs.) The first and second male plugs and the female plug are all electrically connected to a rechargeable battery (not shown in the drawings). The first and second male plugs may be connected to the positive pole of the battery and the female plug to the negative pole of the battery, or the first and second male plugs may be connected to the negative pole of the battery and the female plug to the positive pole of the battery. The battery is preferably a no-memory battery; i.e., it can be fully recharged, regardless of the extent to which it has been discharged.

An optional first switch 20 activates or deactivates a transformer (not shown in the drawings) between the first male plug and the battery. When the switch is set to 110 volts, the transformer is not electrically connected. When the switch is set to 220 volts, the transformer is electrically connected, and steps the voltage from the wall socket received by the male plug down to 110 volts for the battery. (Alternatively, the transformer may be disconnected when the switch is set to 220 volts, and when the switch is set to 110 volts the transformer may step up the voltage to 220 volts for the battery. Alternatively, different voltages may be used. Alternatively, the invention may be configured for only one standard voltage from a wall socket, in which case the first switch will not be needed.) Regardless of whether or not the transformer is connected, a rectifier (not shown in the drawings) between the first male plug and the battery will then convert the alternating current from the wall socket to direct current to recharge the battery.

An optional second switch 22 activates or deactivates a DC to DC converter (not shown in the drawings) between the rechargeable battery and the female plug, for changing the voltage of direct current between the rechargeable battery and the female plug. When the switch is set to 12 volts, the converter is not electrically connected. When the switch is set to 6 volts, the converter is electrically connected, and steps the voltage from the battery down to 6 volts for the female plug. (Alternatively, the converter may be disconnected when the switch is set to 6 volts, and when the switch is set to 12 volts the converter may step up the voltage to 12 volts for the female plug. Alternatively, different voltages may be used. Alternatively, the invention may be configured for only one standard voltage for the battery and female plug, in which case the second switch will not be needed.) In place of the second switch shown in the drawings, a switch may be used that can be set in a plurality of positions, with each position causing the DC to DC converter to output a particular voltage. Or a switch (such as a dial) may be used that can be set in a range of positions corresponding to a range of voltages, with the position of the switch causing the DC to DC converter to output a corresponding voltage.

Figure 2:
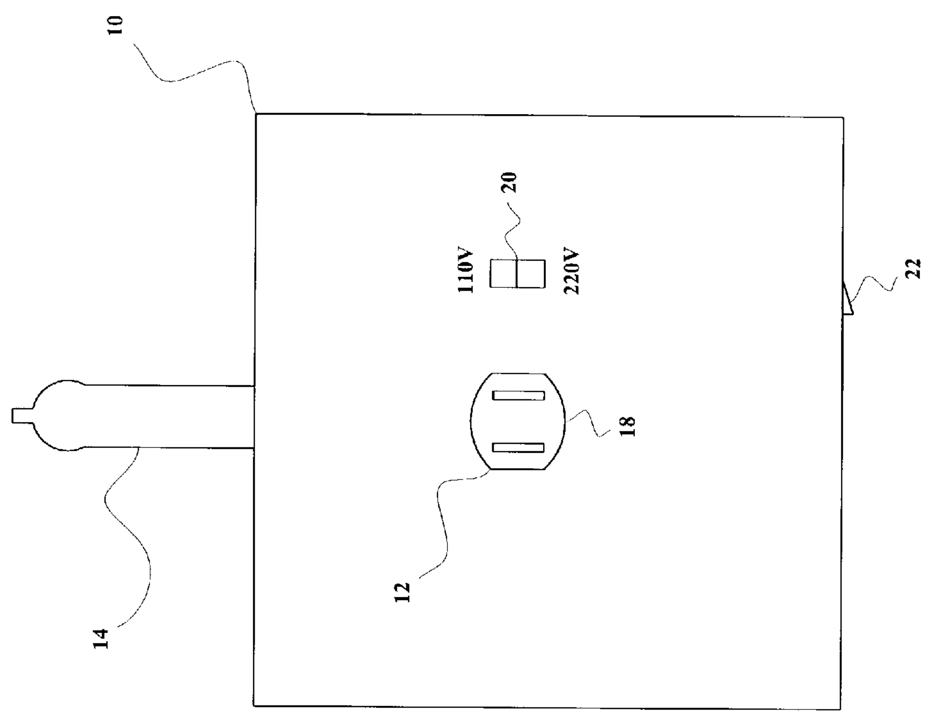
FIG. 2 is a top plan view of the preferred embodiment of the invention.

FIG. 2 is a top plan view of the preferred embodiment of the invention, showing the first male plug 12 for a wall socket and the second male plug 14 for an automobile cigarette lighter.

Figure 3:
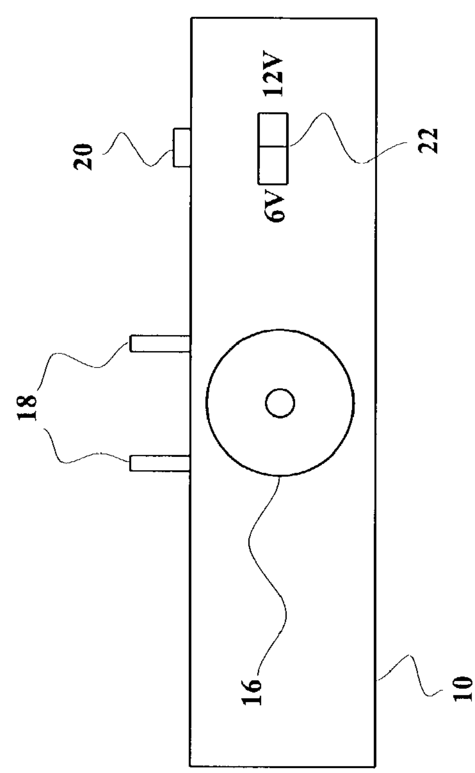
FIG. 3 is front elevational view of the preferred embodiment of the invention.

FIG. 3 is front elevational view of the preferred embodiment of the invention, showing the female plug 16 and the prongs 18 of the first male plug.

Figure 4:
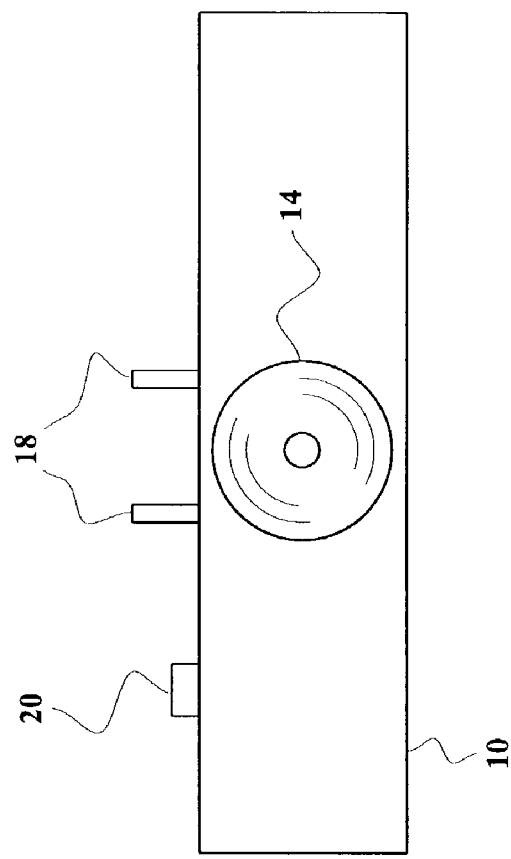
FIG. 4 is a rear elevational view of the preferred embodiment of the invention.

FIG. 4 is a rear elevational view of the preferred embodiment of the invention, showing the second male plug 14 and the prongs 18 of the first male plug.

Figure 5:
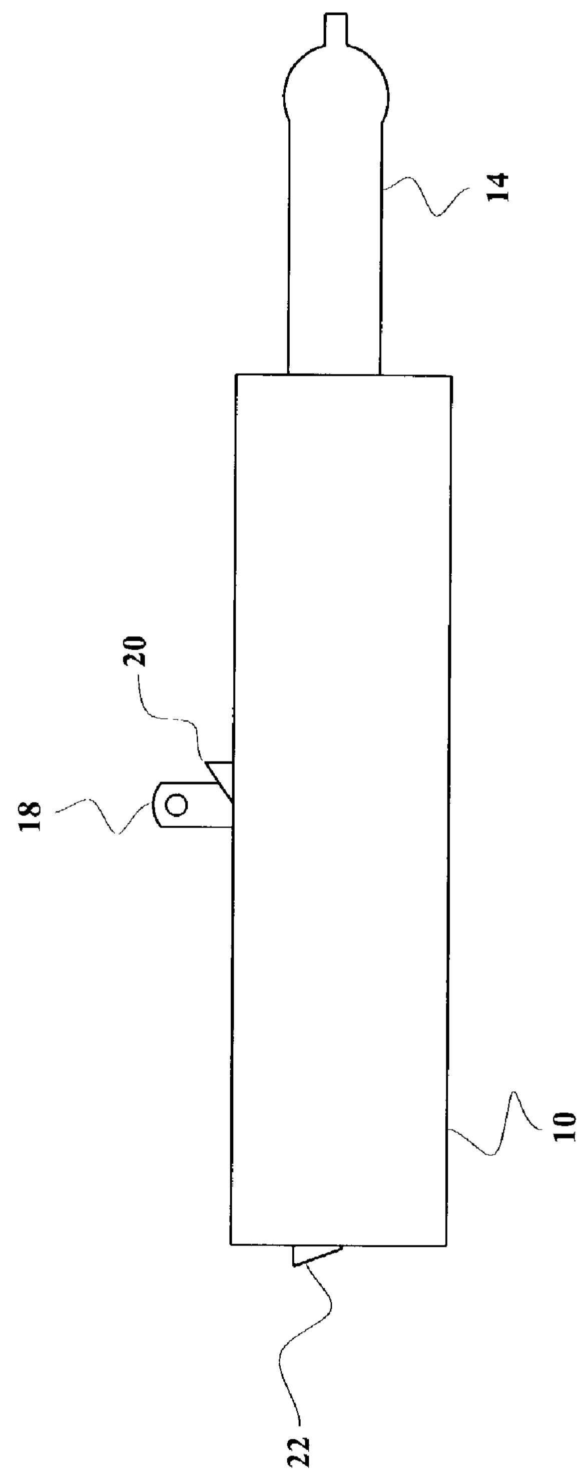
FIG. 5 is a right side elevational view of the preferred embodiment of the invention.

FIG. 5 is a right side elevational view of the preferred embodiment of the invention, showing the second male plug 14 and the prongs 18 of the first male plug.

It is to be understood that the present invention is not limited to the sole embodiment described above, but encompasses any and all embodiments within the scope of the following claims.

I claim:

1. An electrical apparatus, comprising:
- a rechargeable battery;
- a housing for the battery;
- a first male plug extending from the housing, suitably dimensioned and configured to fit into an electrical socket in the wall of a house, the first male plug and the rechargeable battery being electrically connected;
- a second male plug extending from the housing, suitably dimensioned and configured to fit into a cigarette lighter in an automobile, the second male plug and the rechargeable battery being electrically connected;
- a female plug retained in the housing in a fixed position, suitably dimensioned and configured to receive a male plug of an electrically powered device, the female plug and the rechargeable battery being electrically connected, with the female plug able to supply power to the male plug of the electrically powered device;
- a rectifier between the first male plug and the rechargeable battery, for converting alternating current to direct current;
- a transformer between the first male plug and the rectifier,
- a first switch for activating or deactivating the transformer;
- a DC to DC converter between the rechargeable battery and the female plug, for changing the voltage of direct current between the rechargeable battery and the female plug; and
- a second switch that can be set in a range of positions corresponding to a range of voltages, with the position of the switch causing the DC to DC converter to output a corresponding voltage.

* * * * *